United States Patent
Nathadi

(10) Patent No.: US 10,853,292 B2
(45) Date of Patent: Dec. 1, 2020

(54) OPERATION OF A SWITCH IN LINEAR MODE

(71) Applicant: HEWLETT-PACKARD DEVELOPMENT COMPANY, L.P., Houston, TX (US)

(72) Inventor: Raghotham Reddy Nathadi, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 14/897,991

(22) PCT Filed: Aug. 29, 2013

(86) PCT No.: PCT/US2013/057314
§ 371 (c)(1),
(2) Date: Dec. 11, 2015

(87) PCT Pub. No.: WO2015/030774
PCT Pub. Date: Mar. 5, 2015

(65) Prior Publication Data
US 2016/0162428 A1    Jun. 9, 2016

(51) Int. Cl.
| | | |
|---|---|---|
| *G06F 13/40* | (2006.01) | |
| *G06F 1/26* | (2006.01) | |
| *G06F 1/3215* | (2019.01) | |
| *G06F 9/4401* | (2018.01) | |
| *G06F 13/42* | (2006.01) | |
| *G06F 1/28* | (2006.01) | |

(52) U.S. Cl.
CPC ............ *G06F 13/4022* (2013.01); *G06F 1/26* (2013.01); *G06F 1/266* (2013.01); *G06F 1/3215* (2013.01); *G06F 9/4413* (2013.01); *G06F 13/4282* (2013.01); *G06F 1/28* (2013.01)

(58) Field of Classification Search
None
See application file for complete search history.

(56) References Cited

U.S. PATENT DOCUMENTS

| | | | |
|---|---|---|---|
| 6,541,879 B1 | 4/2003 | Wright | |
| 7,689,841 B2 | 3/2010 | Lee | |
| 8,238,126 B2 | 8/2012 | Ruan et al. | |
| 8,443,222 B1 | 5/2013 | Niimura | |
| 8,587,274 B2 * | 11/2013 | Strydom | ............... H02M 3/158 323/282 |

(Continued)

FOREIGN PATENT DOCUMENTS

| | | |
|---|---|---|
| EP | 1798835 | 6/2007 |
| WO | WO-2007103358 | 9/2007 |

OTHER PUBLICATIONS

Fully Integrated Switch-mode One-cell Li-Ion Charger with Full USB Compliance, (Research Paper), Feb. 2010.

*Primary Examiner* — Henry Tsai
*Assistant Examiner* — Aurangzeb Hassan
(74) *Attorney, Agent, or Firm* — HPI Patent Department

(57) ABSTRACT

A computing device includes a switch that operates in a linear mode according to a threshold based on a detection of an increase of current drawn by a device that is connected to the switch. The linear mode delivers a constant amount of current to the device. The switch, upon reaching the threshold, exits the linear mode and operates in a non-linear mode to communicate power to the device.

15 Claims, 4 Drawing Sheets

(56) References Cited

U.S. PATENT DOCUMENTS

| | | | |
|---|---|---|---|
| 9,167,853 B2 * | 10/2015 | Xiang | H02J 7/045 |
| 9,369,161 B1 * | 6/2016 | Chukka | H04B 1/0475 |
| 2002/0135339 A1 * | 9/2002 | Tang | G06F 1/26 |
| | | | 323/274 |
| 2003/0006650 A1 * | 1/2003 | Tang | H02M 3/1584 |
| | | | 307/43 |
| 2003/0137787 A1 * | 7/2003 | Kumar | H02M 3/156 |
| | | | 361/18 |
| 2006/0017423 A1 * | 1/2006 | Frith | H02J 7/0068 |
| | | | 323/268 |
| 2006/0250825 A1 | 11/2006 | Grigore | |
| 2006/0261788 A1 * | 11/2006 | May | H02M 1/32 |
| | | | 323/273 |
| 2009/0033293 A1 | 2/2009 | Xing et al. | |
| 2009/0102429 A1 * | 4/2009 | Xu | H02J 7/0077 |
| | | | 320/162 |
| 2010/0064153 A1 | 3/2010 | Gk et al. | |
| 2012/0092897 A1 | 4/2012 | Hara et al. | |
| 2012/0105151 A1 * | 5/2012 | Nakamura | H03F 1/0211 |
| | | | 330/131 |
| 2014/0022680 A1 * | 1/2014 | Berggren | H02H 3/02 |
| | | | 361/79 |
| 2014/0070730 A1 * | 3/2014 | Walde | H05H 1/24 |
| | | | 315/307 |
| 2015/0124672 A1 * | 5/2015 | Lindoff | H04B 1/04 |
| | | | 370/311 |
| 2018/0292851 A1 * | 10/2018 | Mahajan | G05F 1/575 |

* cited by examiner

OPERATION OF A SWITCH IN LINEAR MODE

BACKGROUND

Universal serial bus (USB) is an industry standard that defines cables, connectors, and communication protocols used in a bus for connection, communication, and supplying power between various devices. USB enables the various devices for plug-and-play capability.

BRIEF DESCRIPTION OF THE DRAWINGS

In the accompanying drawings, like numerals refer to like components or blocks. The following detailed description references the drawings, wherein.

DETAILED DESCRIPTION

Figure 1:
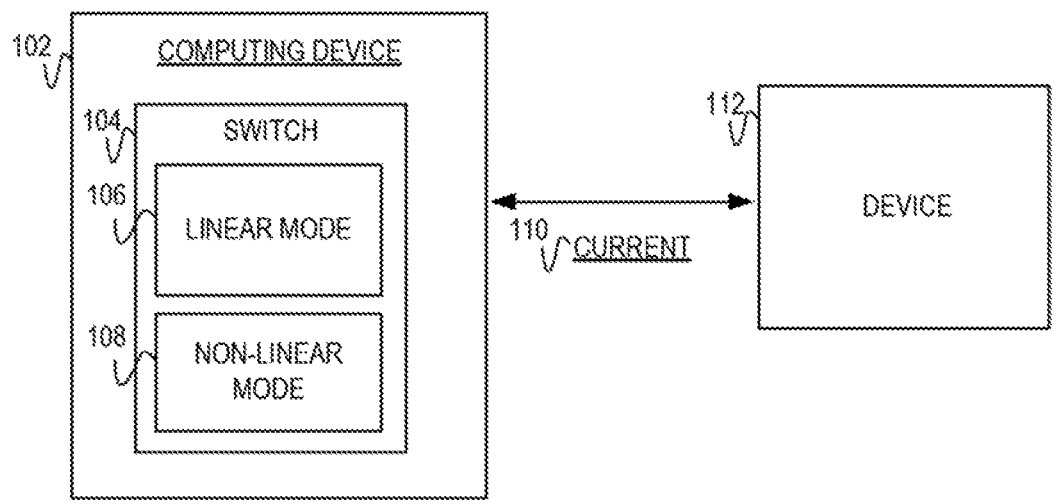
FIG. 1 is a block diagram of an example computing device including a switch to operate in linear mode according to a threshold based upon a detection of increase of current drawn by a device, the switch exits the linear mode to operate in a non-linear mode upon reaching the threshold.

Universal serial bus (USB) devices operate by plugging into a host machine with a power supply to provide power. The power supply may shut down if the USB dev ice draws an excessive amount of inrush or surge current. This leads to leaving the USB device without support which may cause the USB device to shut down. For example, if the USB device has excessive capacitance on its input, the USB device will draw an excessive amount of current in which the host machine will not be able to support. Smaller electrical USB host machines may be constrained by real estate, thus providing an additional power supply to support the USB device when drawing the excessive current is not feasible. Additionally, increasing capacitance on the output of the USB port to support the USB device to draw the excessive current may increase the acoustic noise in the system.

To address these issues, examples disclosed herein provide a computing device to improve reliability of a power system by detecting an increase of current drawn by a device. Upon the detection of the increase of current, a switch operates in a linear mode according to a threshold. The linear mode delivers a constant amount of current to load and as such, may limit the amount of current delivered to the load. For example, in the linear mode, the switch acts as a variable resistor to ensure a constant amount of current is delivered to the device, limiting the current to the device. The threshold is a limitation on an amount of cumulative current and/or a limitation on the amount of time in which the constant current is delivered to the device. Upon reaching the threshold, the switch exits the linear mode. Enabling the switch to operate in the linear mode according to the threshold upon the increase of current, the computing device may continue to support the device in spite of the device drawing a surge of current. Additionally, operating the switch from the linear mode to exiting the linear mode, provides an intelligent feature to the switch to handle the surge of current drawn by the USB device.

In another example, the switch exits the linear mode and enters a non-linear mode. In the non-linear mode, the switch may provide a variable amount of current to the device. In the non-linear mode, if the device exceeds an excessive amount of current, the switch may operate in an off mode to interrupt the current to the device rather than entering the linear mode. For example, the rated current of the device may be a higher magnitude of current than the constant current delivered to the device during the linear mode as the device may include a different rated amount of current than the constant amount of current. This enables the device to receive the rated current for its operations and functions. Additionally, the non-linear mode may monitor the load current to the device and as such, if the load current exceeds an overload set point, the switch may disconnect itself from the device. This implementation provides a safety feature of the computing to prevent the power supply from shutting down. Further, operating the switch from the linear mode to the non-linear mode enables the computing device to continue monitoring the load current drawn by the device.

In summary, examples disclosed herein provide a reliable power system which provides an intelligent aspect by handling a surge of current drawn by a device. Examples disclosed herein continue to support the device without shutting down a power supply in spite of the surge of current.

Referring now to the figures, FIG. 1 is a block diagram of an example computing device 102 including a switch 104 to operate in a linear mode 106 and a non-linear mode 108. The computing device 102 may detect an increase of current 110 drawn by a device 112 and based upon this detection, the switch 104 operates in the linear mode 106 according to a threshold. The threshold may include a limitation on an amount of cumulative current 110 delivered to the device 112 and/or limitation on an amount of time in which a constant amount of current 110 is delivered to the device 112. In this implementation, the threshold is a limitation of the current 110 to delivered to the device 112. Upon reaching the threshold, the switch 104 exits the linear mode 106 and may operate in the non-linear mode 108. FIG. 1 illustrates a computing system with the computing device 102 to provide an amount of current to the device 112. As such, implementations of the computing system include a power system, networking system, or other type of system which provides current 110 to the device 112.

The computing device 102 is a type of host machine through which the device 112 may connect wired or wireless to receive current 110. In one implementation, once the computing device 102 powers on, the switch 104 may operate in the linear mode 106. In this implementation, the device 112 plugs into the computing device 102 and may draw increased current. In another implementation, the computing device 102 may include a controller to detect the increase of load current 110 to the device 112, thus signaling to the switch 104 to operate the linear mode 106 according to the threshold. Although FIG. 1 illustrates the computing device 102 as including the switch 104 to operate in the linear mode 106 and/or non-linear mode 108, implementations should not be limited as this was done for illustration purposes. For example, the computing device 102 may include a controller to operate the switch 104 and/or a power supply to provide current 110 to the device 112. Implementations of the computing device 102 include a mobile device, client device, personal computer, desktop computer, laptop, tablet, notebook, video game console, or other type of electronic device capable of operating the switch 104 in the linear mode 106.

The switch 104 operates in the linear mode 106 according to a threshold upon detecting the increase of current 110 drawn by the device 110. In this implementation, the controller associated with the computing device 102 may track a load current drawn by the device 112. Upon increasing the load current drawn by the device 112, the controller may signal to the switch 104 to operate in the linear mode 106 according to the threshold. If the controller determines the load current does not increase, then the switch 104 may operate in the linear mode 106 irrespective of the threshold. Operating the switch 104 in the linear mode 106 according to the threshold, enables the switch 104 to limit an amount of cumulative current 110 and/or limit the amount of time in which current 110 is delivered to the device 112. The threshold is a limitation of the current 110 delivered to the device 112 over a period of time. This enables a capacitor on the device 112 to charge slowly in a controlled manner. Charging the capacitor on the device 112, enables a battery associated with the device 112 to charge. The threshold may be a predefined parameter as defined by an administrator, and may take into account power limits of the computing device 102 and/or the USB device 112 to maintain minimal operation. In another implementation, the controller may detect when the switch 104 is nearing or reaching the threshold and signal to the switch 104 to exit the linear mode 106. Exiting the linear mode 106, the switch 104 may operate in the non-linear mode 108. In a further implementation, the switch 104 may include a metal-oxide-semiconductor field-effect transistor (MOSFET) which operates as a linear regulator during the linear mode 106 to provide a constant amount of current 110 to the device 112. The switch 104 may operate in the linear mode 106, the non-linear mode 108, and/or an off mode (not illustrated). In the non-linear mode 108, the computing device 102 continues to monitor current 110 to the device 112 and if the current 110 readies an overload set point, the switch 104 enters the off mode. The off mode of the switch 104 may interrupt a flow of current 110 to the device 112 if the device 112 draws or continues to draw an excessive amount of current 110. Implementations of the switch 104 include a semiconductor, electrical device, integrated circuit, electromechanical device, switching voltage regulator, transistor, relay, logic gate, binary slate logic, or other type of switching device that operates in the linear mode 106, non-linear mode 108, and or off mode.

The linear mode 106 is considered in an operation of the switch 104 in addition to the non-linear mode 108 and/or the off mode (not illustrated). In the linear mode 106, the switch 104 operates to provide a constant amount of current 110 to the device 112. In one implementation, the switch 104 may operate in the linear mode 106 upon the device 112 plugging into the computing device 102 to receive current 110. Upon the device 112 plugging into the computing device 102, the computing device 102 may detect the increase of current 110 drawn by the device 112 and signal to the switch 104 to operate in the linear mode 106 according to the threshold. In another implementation, the switch 104 operates as a linear regulator to provide the constant amount of current. In this implementation, the switch 104 may act as a variable resistor to regulate the amount of current 110 to ensure the device 112 receives the constant amount of current 110. This enables the switch 104 to deliver the constant amount of power to the device 112 regardless of the draw of current 110 by the device 112. In a further implementation, upon detecting no increase in the current 110 (e.g., no increase in the load current) drawn by the device 112, the switch 104 may operate in the linear mode 106 irrespective of the threshold. In yet a further implementation, upon detecting the increase in current 110 drawn by the USB device 112, the switch 104 operates in the linear mode 106 until reaching the limitation of the threshold. Upon reaching the threshold, the switch 104 may exit the linear mode 106 and/or operate in the non-linear mode 108.

The non-linear mode 108 of the switch 104 may provide a variable amount of current to the USB device 112, but if the device 112 exceeds an excessive amount of current, the switch 104 operates in the off mode rather than altering the linear mode 106 according to the threshold. During the non-linear mode 108, the load current drawn by the USB device 112 is monitored. In the non-linear mode 108, if the load current exceeds an overload set point, the switch 104 may shut down its connection to the device 112, or in other words, the switch 104 may operate in the off mode. Enabling the switch 104 to operate from the linear mode 106 to the non-linear mode 108 ensures the computing device 102 supports the device 112 in a controlled manner to handle surges of current drawn by the device 112. Additionally, enabling the switch 104 to operate in the linear mode 106, non-linear mode 108, and/or off mode provides an intelligence to the switch 104 for the computing system to remain operational.

The current 110 delivered to the device 112 is an electrical charge provided from the computing device 102 to the device 112. In one implementation, the computing device 102 includes the power supply (not illustrated) to produce the current 110 to provide to the device 112. In another implementation, the current 110 may be considered the load current for the computing device 102 to monitor for increases in the current 110.

The device 112 is an electrical device winch plugs into the computing device 102 as to receive current 110 so it may remain operational. In this implementation, the current 110 provided to the device 112 enables the device 112 to perform its various functions and/or operations. In one implementation, the device 112 includes a universal serial bus (USB) device to power itself from the current 110 received from the computing device 102. In another implementation, the device 112 includes the capacitor which is charged to in turn charge the battery within the device 112. In implementations, the device 112 may include a slave device, computing device, USB device, mobile device, portable device, tablet, notebook, electrical accessory, or other type of electrical device which may draw current 110 to power itself.

Figure 2:
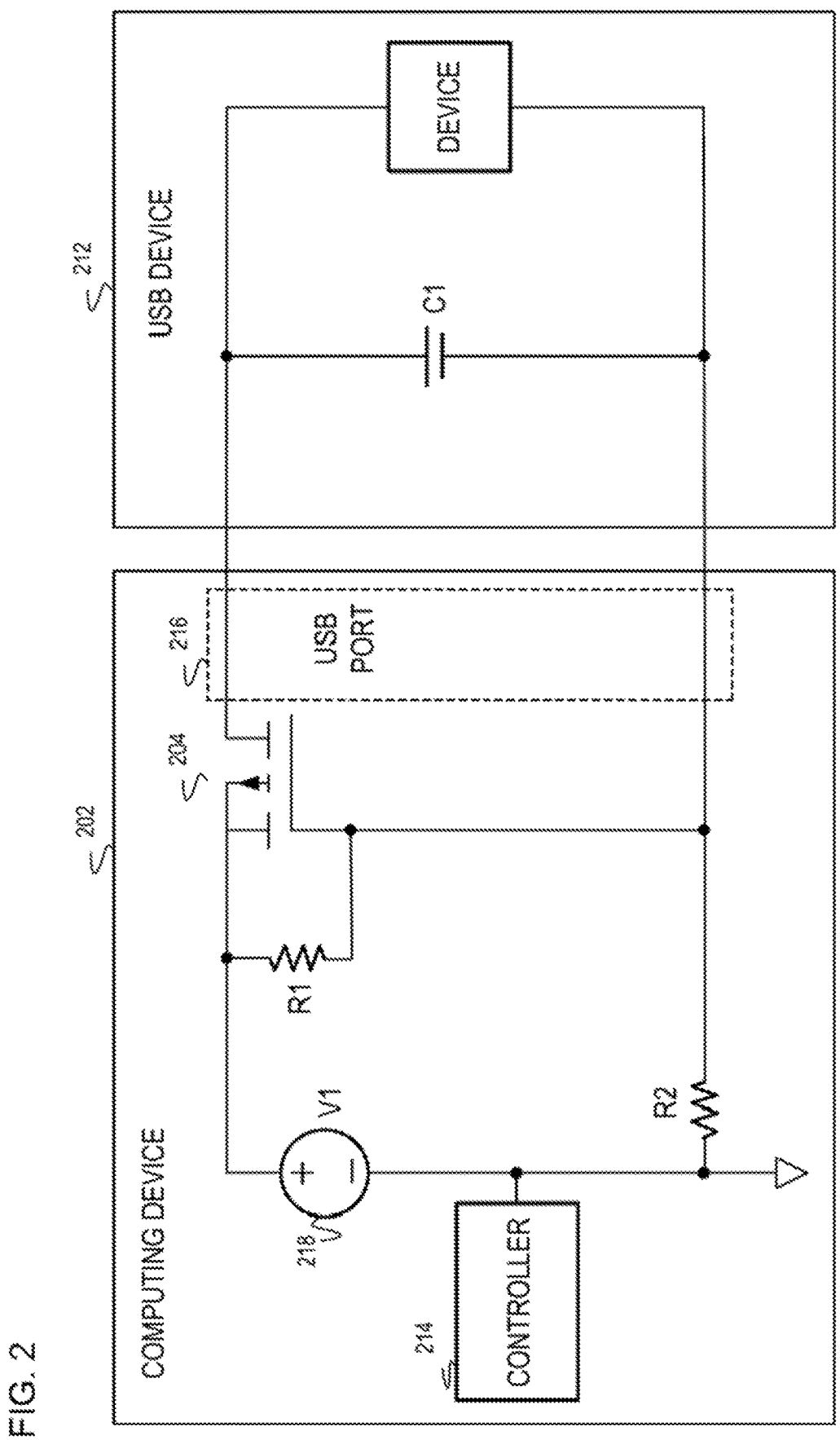
FIG. 2 is a diagram of an example circuit diagram including a computing device with a switch, a controller, and a power supply to detect current drawn by a universal serial bus (USB), the switch operates in a linear mode 10 deliver a constant amount of current through a USB port to the USB device.

FIG. 2 is a block diagram of an example circuit diagram including a computing device 202 with a switch 204, a controller 214, and a power supply 218. The controller 214 detects the current drawn by a universal serial bus (USB) device 212 to charge a capacitor (C1). The capacitor (C1) is stores the charge received from the computing device 202 to power functions and operations of the USB device 212. In another implementation the capacitor (C1) within the USB device 212 is used to charge a battery (not illustrated) within the USB device 212.

Upon detect mg the increase in current drawn by the USB device 212, the switch 204 operates in a linear mode according to a threshold to deliver a constant amount of current through a USB port 216 to the USB device 212. In another implementation, once the computing device 202 powers on, the switch 204 operates in the linear mode. In this implementation, the USB device 212 may plug into the computing device 202, increasing the current to the load (i.e., USB device). The linear mode provides a constant amount of load current and as such, a variable resistor (R1) may vary its resistance so it may provide the constant amount of load current. In the linear mode, the switch 204 operates as a linear regulator to regulate the amount of current to the USB device 212. During the linear mode, the USB device 212 may plug into the computing device 212 to while the controller 214 may detect the increase of current drawn by the USB device 212 upon plugging into the USB port 216. The current provided to the USB device 212 may be transmitted by the power supply 218 within the computing device 202 and through the USB port 216 to the USB device 212. Upon the detection of the increase of current drawn by the USB device 212, the controller 214 may signal to the switch 204 to maintain operation in the linear mode until reaching near the threshold. Upon reaching the threshold, the switch 204 may exit the linear mode. The computing device 202, the switch 204, and the USB device 212 may be similar in structure and functionality to the computing device 102, the switch 104, and the device 112 as in FIG. 1.

The controller 214 detects the increase of current drawn by the USB device 212 and whether the USB device 212 is currently plugged into the computing device 202 through the USB port 216. In this manner, the controller 214 detects the load current provided through the USB port 216 to the USB device 212 and signals to the switch 204 whether to operate in the linear mode according to the threshold or to exit the linear mode. The controller 214 manages the operates and functions of the computing device 202 and as such, implementations of the controller 214 include an integrated circuit, processor, microprocessor, microcontroller, semiconductor, or other type of programmable device that detects the increase of current drawn by the USB device 112 and operates the switch 204, accordingly.

The power supply 218 communicates with the controller 214 to power on and/or off to provide current through the switch 204 to the USB device 212. The power supply 218 may begin by providing power to the switch 204 upon the computing device 202 powering on, thus enabling the switch 204 to operate in the linear mode to provide the constant amount of load current. In one implementation, the power supply 218 may provide a 5 volt rail on the USB port 216 to transmit the current to the USB device 212. Implementations of the power supply 218 include a power feed, power source, generator, power circuit, energy storage, power system, or other type of power supply capable of providing load current to the USB device 212 from the computing device 202.

The USB port 216 provides an interface between the USB device 212 and the computing device 202. The USB port provides a USB connection through which the USB device may plug into for interfacing with the computing dev ice 202.

Figure 3:
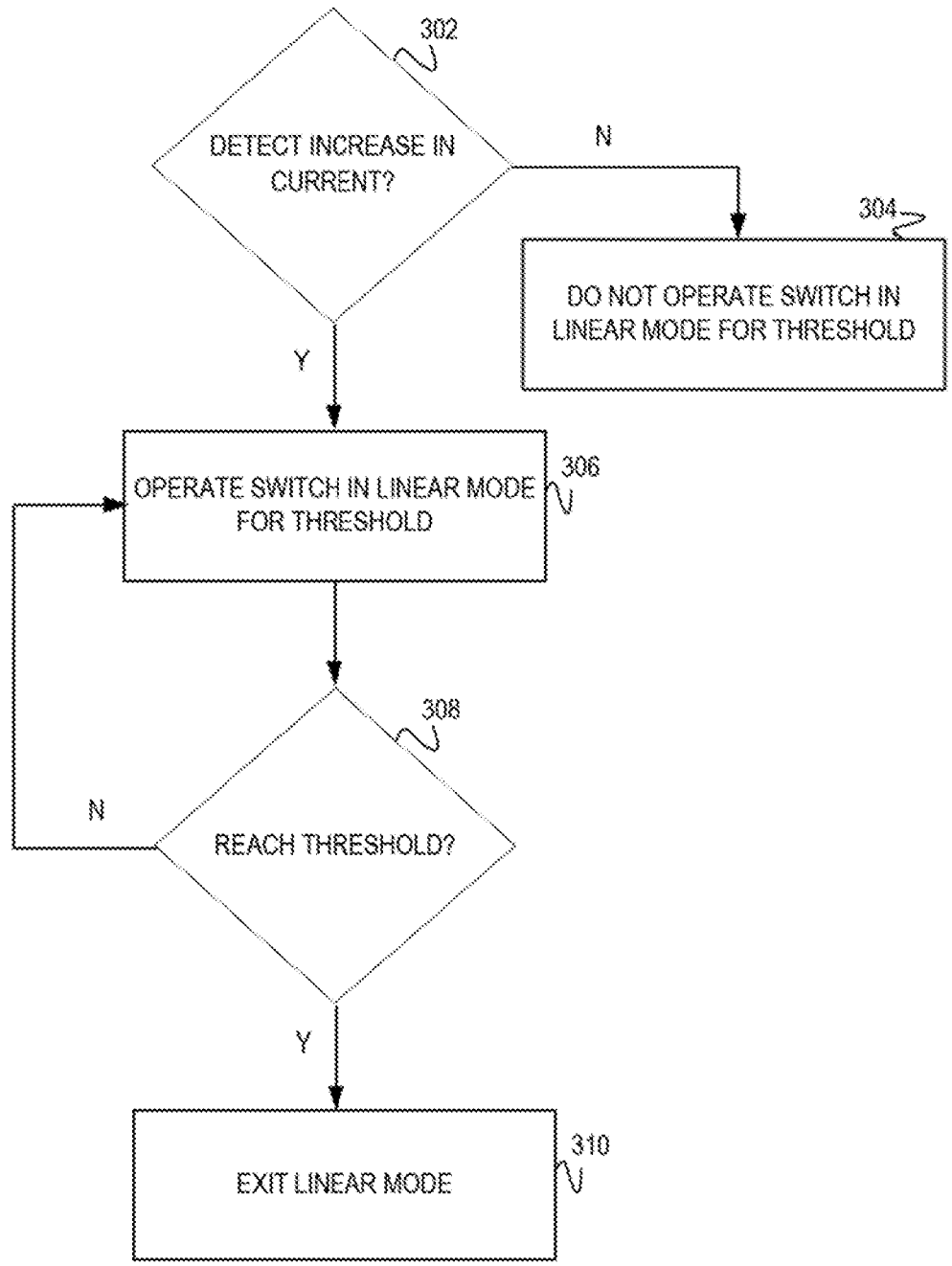
FIG. 3 is a flowchart of an example method to detect an increase in current drawn by a USB device and operate a switch in a linear mode for a threshold based on the detection of increase in current and upon reaching the threshold, the method exits the linear mode.

FIG. 3 is a flowchart of an example method to detect an increase in current by a universal serial bus (USB) device and based on this detection, operate a switch in a linear mode according to a threshold. Upon reaching the threshold, the method exits the linear mode. Otherwise, if no increase in current is detected, the method continues to monitor for the detection of the increase in current. Switching the mode of a switch from the linear mode adds an intelligent component to the switch as the switch may operate as a linear regulator to control the amount of current the USB device draws. Additionally, if the USB device is drawing an excessive amount of current, the switch may limit the amount of current delivered to the USB device for a period of time, enabling the USB device to operate without shutting down the power supply delivering the current. Further, although FIG. 3 is described as implemented by a computing device 102 as in FIG. 1, it may be executed on other suitable components. For example, FIG. 3 may be implemented in the form of executable instructions on a machine readable storage medium, the instructions executable by a controller 214 as in FIG. 2.

At operation 302, the computing device detects the increase of current by the USB device. The computing device is considered a host machine that provides current to the USB device. As such, the computing device may include a power supply to provide current to the USB device and a controller to detect the presence of the increase in current by the USB device. The controller may then signal to the switch to operate in linear mode according to the threshold. The controller may track the amount of current supplied to the USB device and as such, may detect the presence of the increase of current by the USB device. Detecting the increase of current, the controller may determine when the USB device is drawing excessive current and/or the computing device may experience a surge in current to the USB device. In another implementation, the USB device may request the increase of current to the computing device, thus this signals to the computing device the USB device may be drawing the increase of current. Delivering current from the computing device, the USB device may charge an input capacitor associated to the USB device prior to utilizing the received current for functioning. The switch may be operating in the linear mode prior to receiving the signal from the controller to maintain the linear mode according the threshold. In this implementation, the switch may begin operation in linear mode upon the computing device powering on. In another implementation of operation 302, the USB device may plug into the computing device, thus increasing the amount of delivered current. Based on the detection of the increase of current drawn by the USB device, the computing device may maintain operation of the switch in linear mode for a threshold as at operation 306. The linear mode continues to deliver a constant amount of current from the computing device to the USB device. The threshold is a limit of current over a period of time being delivered to the USB device. The increase of current detected by the computing device at operation 302, sets a limit on the current delivered over a period of time. If the computing device determines there is no increase in current drawn by the USB device, the method proceeds to operation 304. Operation 304 does not maintain operation of the switch in linear mode according to the threshold. In another implementation of operation 304, the switch may operate in the linear mode, irrespective of the threshold.

At operation 304, the computing device may not operate the switch in the linear mode according to the threshold. In another implementation, the switch may operate in linear mode irrespective of the threshold. As discussed at operation 302, when the computing device turns on, this signals to the controller to operate the switch in the linear mode. In this implementation, the USB device may plug into the computing device, thus signaling an increase in the current by the USB device. In a further implementation, the operation of the switch in linear mode is not set according to a limit, thus the switch operates irrespective of the threshold. Rather, operating the switch in the linear mode according to the threshold as at operation 306, enables the switch to limit the amount of current and/or limit the amount of time in which current is delivered.

At operation 306, the computing device operates the switch in linear mode according to the threshold. The threshold is a limit on the level of current maintained over a period of time and/or the amount of cumulative current delivered to the USB device. The controller associated with the computing device may track the amount of current delivered and period of time and determine when the computing device is close to reaching the limit of the threshold. In one implementation, the threshold may be a predefined threshold as defined by an administrator. The threshold may take into account the power limits of the computing device and/or the power limits of the USB device. In this implementation, a load current supplied to the USB device is limited for a predefined period of time and/or a predefined cumulative amount of power. This enables the capacitor on the USB device side to charge slowly in a controlled manner. The capacitor may then charge a battery on the USB device. The linear mode operates the switch as a linear regulator to regulate the amount of current delivered from the computing device to the USB device. In one implementation, the switch may act as a variable resistor to regulate the amount of current delivered to the USB device. This enables the switch to deliver a constant amount of power to the USB device regardless of the draw of current by the USB device. Once maintaining operation of the switch in linear mode according to the threshold, the computing device may monitor the switch to determine if the operation is reaching the threshold as at operation 308.

At operation 308, the computing device determines whether the threshold has been reached. If the computing device determines the threshold has not been reached, the method proceeds back to operation 306 to maintain operation of the switch in the linear mode. In this implementation, the computing device lacks when the switch may reach the threshold. Upon reaching the threshold or reaching near the threshold, the method proceeds to operation 310 to exit the linear mode.

At operation 310, upon reaching the threshold at operation 308, the switch exits the linear mode. In this operation, the controller associated with the computing device tracks the functioning of the computing device and determines whether the threshold has been reached. In one implementation, upon exiting the linear mode, the switch may operate in a non-linear mode. The non-linear mode of the switch may continue to supply varying amounts of current to the USB device, but if the USB device exceeds an excessive amount of current, the switch shuts down rather than entering linear mode. In one implementation of non-linear mode, the switch may operate as a metal-oxide-semiconductor field-effect transistor (MOSFET) for amplifying and/or switching electrical signals. In this implementation, the switch may shut down or turn off to disconnect the USB device if the current drawn by the USB device exceeds an overload set point.

Figure 4:
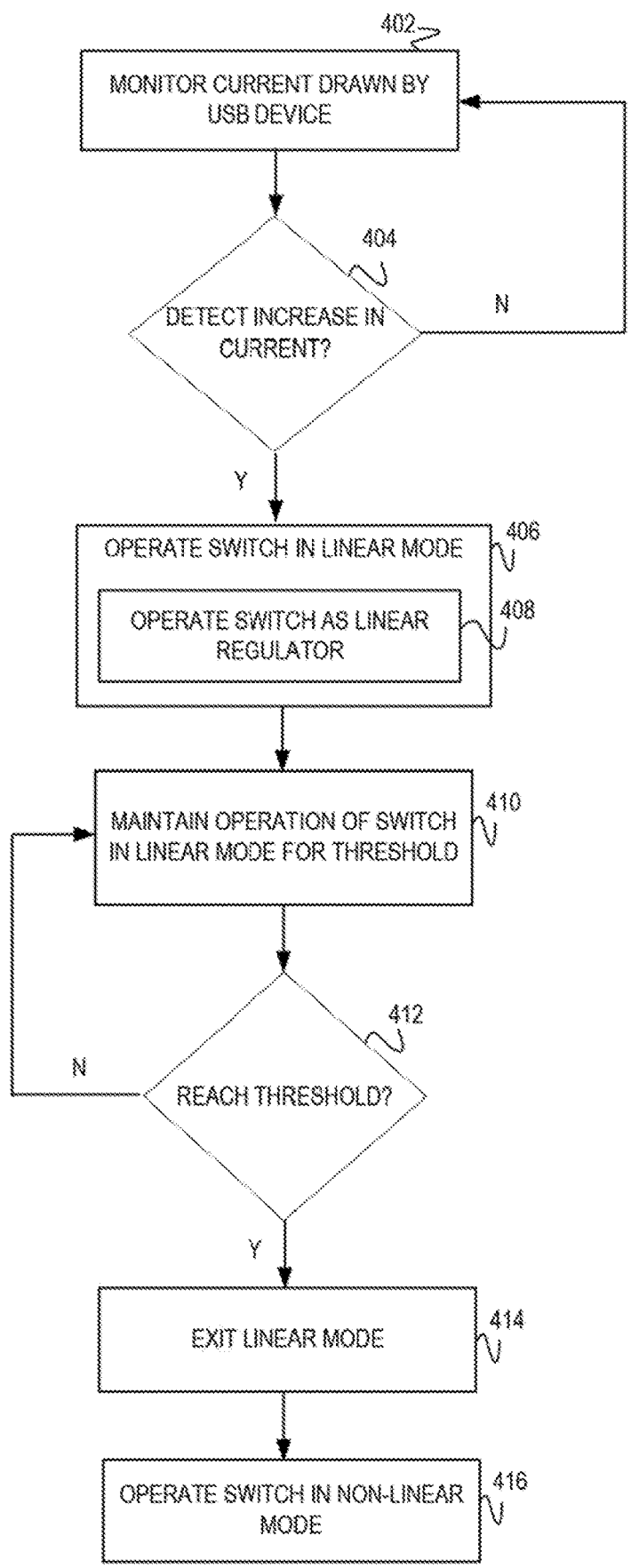
FIG. 4 is a flowchart of an example method to operate a switch in linear mode and based upon a detection of increase in current, the method maintains operation of the switch for a threshold, accordingly.

FIG. 4 is a flowchart of an example method to monitor a current drawn by a USB device to detect an increase of current. The method may proceed to operate a switch in linear mode according to a threshold based upon the detection of increase in current. Additionally, the method may exit the linear mode of the switch upon reaching the threshold and then operate the switch in a non-linear mode. Controlling the operational modes of the switch based on the detection of the increase in current enables a computing device to manage the amount of current delivered to a universal serial bus (USB) device without shutting down the USB device and/or computing device upon a surge of current drawn by the USB device. As explained earlier, the computing device is considered a host machine to the USB device in that it provides current to the USB device so it may perform various operations and/or tasks. The computing device may be used to carry out operations 402-416 and as such, the computing device may include a power supply and controller to carry out these operations 402-416. Further, although FIG. 4 is described as implemented by the computing device 102 as in FIG. 1, it may be executed on other suitable components. For example, FIG. 4 may be implemented in the form of executable instructions on a machine readable storage medium, the instructions executable by a controller 214 as in FIG. 2.

At operation 402, the controller may monitor current drawn by the USB device. The controller may monitor the current by measurements of the output current through a sensor or other type current sensing device to track the amount of power drawn by the USB device at a given time. Monitoring the current to the USB device, enables the computing device to track the various current levels drawn by the USB device. In one implementation, when the computing device powers on, the controller may monitor the current. In another implementation, this enables the computing device to monitor the load current to determine whether the USB device is currently plugged into the computing device.

At operation 404, the computing device may detect the increase of current drawn by the USB device. The controller associated with the computing device may track the level of current drawn by the USB device and may include the sensor to take various output current measurements. Upon determining there is the increase in current drawn by the USB device, the method may proceed to operation 406. At operation 404, if there is no detection of the increase in current, or in other words upon determining the USB device is not drawing the increase in current, the method may proceed back to operation 402 to continue monitoring the current drawn by the USB device. Operation 404 may be similar in functionality to operation 302 as in FIG. 3.

At operation 406, the computing device may operate the switch in linear mode. The linear mode delivers a constant amount of current to the USB device, thus the current delivered to the USB device may be limited. Operating the switch in the linear mode, limits the amount of current delivered to the USB device when the USB device may be requesting an excessive amount of current. This controls the amount of current delivered to the USB device to maintain operation of the computing device and/or the USB device. In the linear mode, as at operation 408, the switch acts a linear regulator to maintain a steady voltage, thus enabling the switch to supply the constant amount of power. Operation 406 may be similar in functionality to operation 306 as in FIG. 3.

At operation 408, the computing device operates the switch as the linear regulator in the linear mode. Controlling the switch to act as the linear regulator, enables the switch to maintain a continuous output voltage and thus, the constant amount of current to the load. In this implementation, the resistance of the switch varies in accordance with the load (i.e., USB device) resulting in the constant output voltage. For example, the switch acts as the linear regulator by adjusting a variable resistor to maintain the constant output voltage, thus the constant amount of current to the load.

At operation 410, the computing device may maintain operation of the switch in the linear mode according to the threshold. The computing device maintains operation in the linear mode according to the threshold upon the determination the USB device is drawing the increase in current at operation 404. The threshold is a limit on the constant amount of current delivered to the USB device. The limit may be predefined by an administrator and include providing the constant amount of current for a predefined period of time and/or providing the constant amount until reaching a cumulative amount of current. Operating the switch in the linear mode, the switch charges an input capacitor on the USB device in a controlled manner. Charging the input capacitor on the USB device enables charging of a battery within the USB device.

At operation 412, the computing device monitors whether the threshold has been reached or is nearing completion. The threshold is the limitation placed on either the cumulative amount of current provided to the USB device or delivering the constant current for a period of time. At this operation, if the threshold is close to being reached, the method may proceed to operation 414 for the switch to exit the linear mode. If the threshold is not close to being reached (i.e., not nearing completion), the computing device may signal to the switch to maintain operation in the linear mode as at operation 410 until reaching the threshold. Operation 412 may be similar in functionality to operation 308 as in FIG. 3.

At operation 414, the computing device may signal to the switch to exit the linear mode. The switch exits the linear mode, upon reaching the threshold detected at operation 412. In one implementation, the computing device signals the switch to change to a non-linear mode as at operation 416. In another implementation, the switch may enter an off mode to interrupt the flow of load current to the USB device. Operation 414 may be similar in functionality to operation 310 as in FIG. 3.

At operation 416, the computing device may operate the switch in the non-linear mode when exiting the linear mode at operation 414. In one implementation, the switch includes a MOSFET and as such, the MOSFET operates in regular operation in the non-linear mode. The non-linear mode is the regular operation of the switch irrespective of the linear mode. In the non-linear mode of the switch, the load current drawn by the USB device is monitored, thus if the load current exceeds an overload set point, the switch shuts down its connection to the USB device. The non-linear mode operates as the switch with an on and off, so dial when it is turned on, the switch delivers current but experiencing the increase in current, the switch may turn off in non-linear mode, thus disconnecting the USB device from the switch. The linear mode continues to provide current to the USB device, albeit with limitation of the delivering the constant amount of current to the USB device. Enabling the switch to operate from the linear mode to the non-linear mode ensures the computing device continues support to the USB device in a controlled manner to handle the USB device drawing a surge of current.

In summary, examples disclosed herein provide a reliable power system which provides an intelligent aspect by handling a surge of current drawn by a device. Examples disclosed herein continue to support the device without shutting down a power supply in spite of the surge of current.

I claim:

1. A computing device comprising:
a switch comprising a regulator; and
a controller to:
cause the regulator to operate in a linear mode according to a threshold based on a detection of an increase of a current drawn by a device connected to the regulator, wherein the operation of the regulator in the linear mode delivers a constant amount of the current;
upon reaching the threshold, cause the regulator to exit the linear mode and operate in a non-linear mode to provide power to the device, wherein the current varies during the non-linear mode of operation of the regulator;
monitor the current during the operation of the regulator in the non-linear mode; and
turn off the regulator in response to the current during the operation of the regulator in the non-linear mode exceeding a current limit.

2. The computing device of claim 1, wherein the regulator comprises a metal-oxide-semiconductor field-effect transistor (MOSFET), and the MOSFET comprises a controlled current path between a power source and the device.

3. The computing device of claim 1, further comprising:
a power supply to provide the constant amount of the current; and
a universal serial bus (USB) port to connect the computing device to the device for delivery of the constant amount of the current, wherein the regulator is to connect to the device through the USB port.

4. The computing device of claim 1, wherein, in the linear mode, the regulator is to operate to provide a rated current to the device, the rated current rated according to the device.

5. The computing device of claim 1, wherein the device comprises a universal serial bus (USB) device, and the threshold is a predefined amount of current over a period of time.

6. A method performed by a computing device, comprising:
detecting an increase of a current to a universal serial bus (USB) device;
operating a switch to provide the current, wherein the switch comprises a regulator, operating the switch comprises operating the regulator in a linear mode based upon the detection of the increase of the current, the linear mode delivers a constant amount of the current, and the current varies during a non-linear mode of operation of the regulator;
based on the constant amount of the current and a period of time at which the linear mode delivers the constant amount of the current, exiting the linear mode and operating the regulator in the non-linear mode to provide the current;
monitoring the current during the operation of the regulator in the non-linear mode; and
turning off the regulator in response to the current during the operation of the regulator in the non-linear mode exceeding a current limit.

7. The method of claim 6, wherein operating the regulator in the non-linear mode comprises delivering a rated current to the USB device.

8. The method of claim 6, wherein operating the regulator in the linear mode further comprises:
operating the regulator as a linear regulator in the linear mode; and
varying a resistance corresponding to the regulator to maintain the constant amount of the current despite the detection of the increase of the current.

9. A computing device comprising:
a switch comprising a regulator; and
a controller to:
- cause the regulator to operate in a linear mode delivering a constant amount of current to a device connected to the regulator for a period of time based on a detection of a surge in current to the device;
- cause the regulator to exit the linear mode in response to expiration of the period of time;
- cause the regulator to operate in a non-linear mode after the period of time, wherein a current drawn by the device in the non-linear mode varies;
- monitor the current drawn by the device during the non-linear mode; and
- turn off the regulator in response to the current drawn by the device during the non-linear mode exceeding a current limit.

10. The computing device of claim 9, wherein the device includes a universal serial bus (USB) device, the computing device further comprising:
a USB port to deliver the constant amount of the current to the USB device, wherein the regulator is to connect to the device through the USB port.

11. The computing device of claim 1, wherein the threshold is based on a period of time at which the operation of the regulator in the linear mode delivers the constant amount of the current.

12. The computing device of claim 1, wherein the threshold is based on the constant amount of the current and a period of time at which the operation of the regulator in the linear mode delivers the constant amount of the current.

13. The computing device of claim 1, wherein the controller is to:
- detect no increase in the current drawn by the device; and
- in response to the detection of the no increase in the current drawn by the device, cause the regulator to operate in the linear mode irrespective of the threshold.

14. The method of claim 6, wherein the regulator exits the linear mode responsive to detecting that a threshold is reached based on the period of time at which the linear mode delivers the constant amount of the current.

15. The method of claim 6, wherein the constant amount of the current is delivered to the USB device through a USB port of the computing device.

* * * * *